United States Patent

[11] 3,566,901

| [72] | Inventor | Nils E. Swedberg<br>Rockford, Ill. |
|---|---|---|
| [21] | Appl. No. | 802,765 |
| [22] | Filed | Feb. 27, 1969 |
| [45] | Patented | Mar. 2, 1971 |
| [73] | Assignee | Sundstrand Corporation |

[54] FUEL REGULATING VALVE
15 Claims, 4 Drawing Figs.

[52] U.S. Cl. ................................................ 137/87,
137/108, 137/117
[51] Int. Cl. .................................................. G05d 7/01,
G05d 16/06
[50] Field of Search ........................................... 137/87,
108, 115, 116, 116.3, 117, 118, 119, 459, 497

[56] References Cited
UNITED STATES PATENTS
3,444,880  5/1969  Mercier ...................... 137/108

| 3,446,230 | 5/1969 | Swedberg .................... | 137/108 |
| 3,446,231 | 5/1969 | Magnusson .................. | 137/108 |
| 3,446,232 | 5/1969 | Erikson ....................... | 137/108 |

Primary Examiner—William F. O'Dea
Assistant Examiner—William H. Wright
Attorney—Hofgren, Wegner, Allen, Stellman & McCord ABSTRACT: A fuel burner regulating valve assembly including a main regulating valve for controlling the supply of fuel to a burner nozzle and a flow responsive valve upstream of the main regulating valve for bypassing fluid from the main valve until a predetermined flow rate is achieved, together with a variable orifice for providing a pressure drop that controls the flow responsive valve, the variable orifice being located in the supply passage to the main regulating valve and automatically operative to change its effective area with flow rates above the predetermined flow rate to maintain a substantially constant pressure drop thereacross.

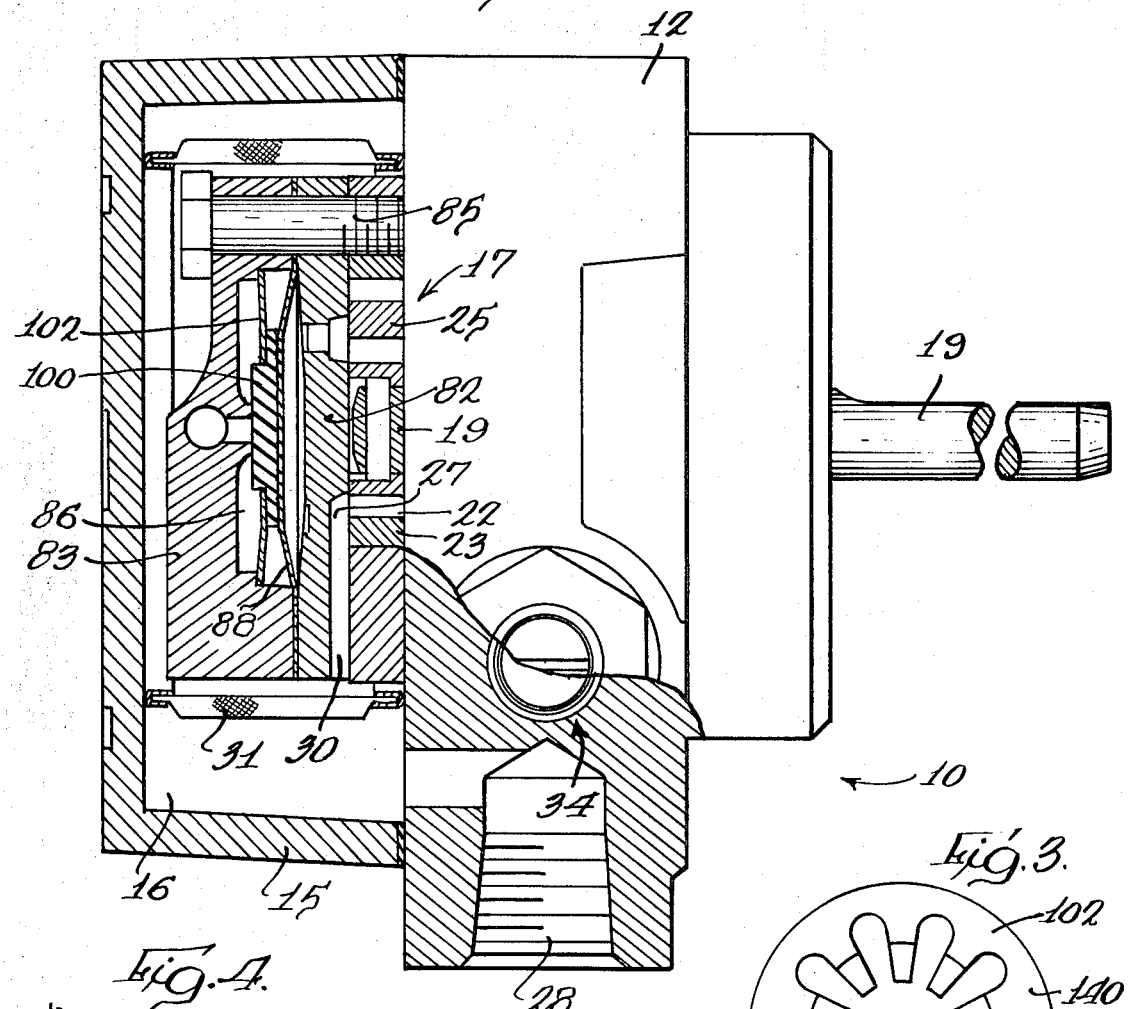

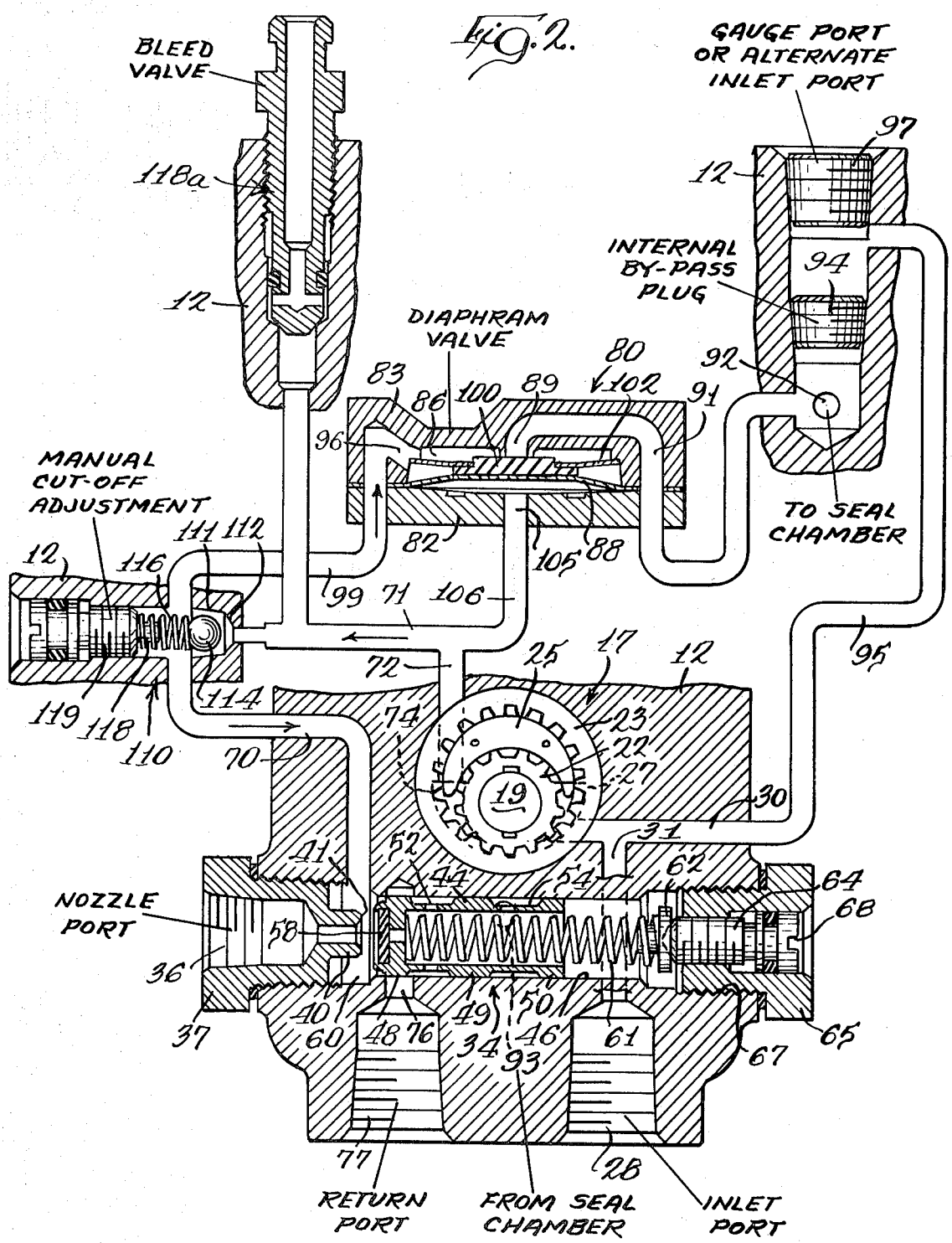

FUEL REGULATING VALVE

BACKGROUND OF THE INVENTION

Oil burner units have in the past been provided with regulating valves between the oil burner nozzles or nozzle which discharge fuel into the combustion chamber and the pump which supplies fuel oil to the nozzle. Generally, these regulating valves open upon delivery of a predetermined supply pressure from the pump, regulate constant pressure flow to the burner nozzles, and shut off the supply of fuel oil to the nozzles when the pump is turned off on shutdown. In addition to regulating the pressure of fuel oil delivered to the burner nozzles, these valves oftentimes have a bypass function of diverting a large portion of the fuel oil delivered by the pump back to the tank or pump reservoir so that only a portion of the fuel oil supplied by the pump is delivered to the nozzle.

One of the basic problems in fuel oil regulating valves of this general character is that the transient variations in the fuel oil discharge from the nozzles both at startup and shutdown cause highly undesirable smoking in the combustion chamber at these times. Various means have been provided in the past in attempt to effect rapid valve action and minimize the problem of smoking, but to a large extent the prior solutions have not solved all the problems of a valve for this purpose, and have had certain characteristics that detract from the performance of the regulating valve.

To minimize this problem of transient variations in the fuel oil discharge both at startup and at shutdown, it is desirable that the regulating valve open rapidly on startup at a high pump r.p.m. and close rapidly at shutdown at a high r.p.m. so that the flow variations are minimal from the time when the regulating valve is closed to the time when it is opened and from the time when it is opened to the time when it is closed.

Various devices have been provided in the past for the purpose of providing a high pump r.p.m. startup and shutdown fuel oil regulating valve. One such device is disclosed in my copending application Ser. No. 557,056, now U.S. Pat. No. 3,446,230 filed Jun. 13, 1966, and assigned to the assignee of the present invention. This prior device includes a flow responsive valve upstream and in series with the regulating valve. This auxiliary valve senses discharge flow from the associated gear pump and serves to bypass flow from the pump so long as it is below a predetermined level. When the valve senses a predetermined high flow from the pump, it pressurizes the main regulating valve causing rapid valve opening at the desired time when pump r.p.m. is high. For sensing the flow in the supply passage from the gear pump, the secondary valve has an orifice through which flow from the pump passes so that a pressure drop exists across the valve serving to position it against the bias of a spring. At the predetermined high flow rate, the secondary valve assumes a position in which it closes a bypass passage and directs all of the flow, at least initially, to the main regulating valve chamber where it opens the valve and discharges fluid to the burner nozzle.

An additional refinement in this basic construction is the provision of a valve which limits the back pressure on the main supply pump to a predetermined value. That is desirable because pumps made by one manufacturer, even the same model pump, commonly have variations in flow capacity of as much as 15 percent from one pump to another. This is due to normal machining tolerances permissible in the industry. One solution to this problem is disclosed in the Carl Goran Magnusson application Ser. No. 597, 134, now U.S. Pat. No. 3,446,231 filed Nov. 25, 1966, and assigned to the assignee of the present invention. The Magnusson application represents an improvement over the basic construction described in my application Ser. No. 557,056 in providing a secondary bypass valve which opens after a predetermined high flow rate from the pump has been achieved and after the main regulating valve is open so hat any further increase in discharge from the pump will not increase the pressure upstream of the secondary flow-responsive valve.

The present invention represents an improvement in both the high cutoff and high startup r.p.m. function of these prior valves as well as an improvement in the function of limiting the back pressure on the pump.

SUMMARY OF THE PRESENT INVENTION

In accordance with the present invention, a diaphragm valve is provided for bypassing fluid from the main regulating valve both prior to the time the pump reaches a predetermined r.p.m. and immediately subsequent to the time the pump r.p.m. falls below the predetermined desired shutoff r.p.m. The use of a diaphragm valve for providing the rapid startup and cutoff functions relative to the main regulating valve results in improved reliability in the startup and cutoff functions.

Another improvement in the present construction is the provision of a spring-biased valve defining the variable area orifice and constructed to reduce orifice clogging and maintain a substantially constant pressure drop across the diaphragm valve above the predetermined pump r.p.m. The valve is positioned in the supply conduit from the pump to the main regulating valve and the pressure drop across the valve is employed to position the diaphragm valve so that at a predetermined pump r.p.m., the pressure drop across the valve will be sufficient to close the diaphragm valve which directs the fluid supply from the pump to the main regulating valve rather than bypassing the supply fluid. As shown the variable orifice is provided by a ball valve movable in a frustoconical opening so that as the flow rate from the pump increases above the predetermined value, the effective orifice area will be automatically increased maintaining substantially the same pressure drop across the orifice and thereby limiting the back pressure on the pump to a predetermined value. The movement of the ball in the frustoconical opening also serves to minimize clogging of the orifice. Alternatively, the ball valve may be in the form of a conical or frustoconical member movable in an annular seat to vary the orifice opening.

BRIEF DESCRIPTION OF THE DRAWINGS

FIG. 1 is an elevation view, partly in cross section, illustrating a fuel burner pump incorporating the regulating valve according to the present invention;

FIG. 2 is a schematic illustration of the pump and regulating valve assembly shown in FIG. 1;

FIG. 3 is a plan view of the diaphragm spring; and

FIG. 4 is a curve showing the hydraulic and spring forces on the diaphragm.

DETAILED DESCRIPTION OF THE PREFERRED EMBODIMENT

Referring to both FIGS. 1 and 2, the fuel burner pump assembly 10 is seen to include a housing member 12 to which is attached by suitable fastening means another housing member or cap 15 which defines a fluid reservoir 16.

Mounted within the housing member 12 is a rotary gear pump 17 driven by an input shaft 19 adapted to be rotated by a suitable motor.

The pump 17 is of conventional construction by itself and includes an inner gear 22 eccentrically disposed with respect to an intermeshing outer gear 23. A crescent shaped member 25 is positioned between the nonengaging portions of the teeth on the gears for the purpose of sealing the expanding fluid chambers defined by the gears from the contracting fluid chambers in well-known fashion. The pump 17 includes an inlet port 27 in an end plate 82 and communicating with reservoir 16 through passage 30 and strainer 31. An inlet port 28 in housing member 12 permits fluid supply to reservoir 16 from a storage tank (not shown).

For the purpose of maintaining a substantially constant pressure flow of fluid from the pump 10, a main regulating valve assembly 34 is provided in the housing member 12. The function of the valve 34 is to control the fluid flow through a nozzle port 36 defined by a fitting 37 threaded into a bore 38 in one end of housing 12. The fitting 37 has a projection 40 defining a valve seat 41 adapted to be closed by the regulating valve. A suitable conduit (not shown) connects the nozzle port 36 to the fuel burner nozzle or nozzles.

The regulating valve 34 includes a valve member 44 slidable in a valve bore 46 in housing member 12. Valve member 44 is hollow and includes lands 48, 49 and 50 separated by reduced portions 52 and 54. Affixed within an undercut recess in the forward end of valve member 44 is a valve closure 58 adapted to engage valve seat 41 and close the nozzle port 36.

The regulating valve member 44 defines with bore 46 a main regulating valve chamber 60 which when pressurized moves the valve member 44 to the right against the closing force of a coil compression spring 61 seated within the hollow portion of valve member 44 and reacting against a normally stationary, but adjustable spring seat 62.

The spring seat 62 is carried by a threaded member 64 which is adjustable in a cap fitting 65 in turn threaded in a bore 67 coaxial with bore 46. The spring seat 62 and the tension on spring 61 may be adjusted by turning member 64 as by means of a suitable tool in slot 68 in the threaded member 64. By adjusting the tension on spring 61, the regulated pressure in the nozzle port 36 may be varied as desired.

For the purpose of supplying fluid to the main regulating valve chamber 60, supply passages 70, 71 and 72 are provided in the housing 12, the latter passage 72 communicating with pump outlet port 74. When the pressure in chamber 60 is sufficient to overcome the closing force of spring 61, valve member 44 will move to the right opening the nozzle port 36 and permitting flow to the burner nozzle (not shown). Only a portion of the fuel from the supply passage 70 exits the regulating valve 34 through the burner nozzle port, and the remaining portion bypasses the nozzle port and exits the valve bore 46 through port 76 and return port 77 adapted to connect with a pipe which communicates with and conveys fluid to the storage tank. The flow from the pump 17 is sufficient to move valve member 44 in normal operation to the right sufficiently so that land 48 uncovers the port 76 continuously bypassing fluid out the return port while the valve member 44, in conjunction with spring 61, modulates a constant pressure outflow from nozzle 36.

As described generally above, a diaphragm valve 80 provides for a high startup r.p.m. and a high shutdown r.p.m. on operation of the regulating valve 34. The diaphragm valve 80 is mounted in a housing block adjacent pump end plate 82 and fixed to housing member 12 by threaded fasteners 85 as shown more clearly in FIG. 1. The housing members 82 and 83 define a chamber 86 having a resilient diaphragm 88 extending completely thereacross and sandwiched between the housing members. Housing member 83 has a centrally disposed low pressure outlet port 89 which communicates through passage 91 with a passage 92 adapted to communicate with a chamber housing a rotary shaft seal (not shown) on shaft 19 at the right end of housing 12, as taught in the aforementioned pending applications. Fluid is returned from the seal chamber to valve bore 50 as at 93. Alternatively, with the removal of the bypass plug 94, flow from the diaphragm valve 80 may be ported to a return passage 95 directly to the inlet of pump 17. Closure plug 97 may be removed to permit installation of a pressure gauge to check inlet vacuum.

Also formed in the valve member 83 is an inlet port 96 communicating with the chamber 86 on the same side of the diaphragm 88 as the outlet port 89. Inlet port 96 communicates through a passage 99 with the main supply passage 70 and the main regulating valve chamber 60.

The diaphragm 88 carries a valve member 100 which seals and closes port 89 in the position shown in FIG. 2. The diaphragm 88 and valve member 100 are biased to an open position continuously by means such as Belleville spring 102. When the valve is in its open position fluid may flow freely from passage 99 to passage 91 venting the chamber 60. For the purpose of closing the port 89 and preventing venting flow through passage 91, a control port 105 is provided which communicates through a passage 106 with the supply passage 71. Thus, when a sufficient pressure difference exists between passage 71 and passage 99, providing a pressure drop across diaphragm 88, the diaphragm valve 80 will close preventing the venting of fluid through passage 91 and permitting rapid buildup in pressure in chamber 60 since supply fluid from passage 71 can no longer be vented through the diaphragm valve 80. This occurs on startup. Conversely, when the pressure difference between passages 71 and 99 reduces to a predetermined value on shutdown of the pump 17, the pressure drop across diaphragm 88 will be insufficient to maintain the diaphragm valve closed and valve member 100 will move away from port 89 permitting venting of the valve chamber 60 through passages 70,99, chamber 86 and passage 91 to the reservoir 16 or pump inlet. In this manner, the main regulating valve chamber is rapidly pressurized and depressurized in a more rapid and reliable fashion by the diaphragm valve 80 than heretofore known in the prior art.

For controlling the diaphragm valve 80 to close at a predetermined high r.p.m. on startup and open at a predetermined high r.p.m. on shut down, an automatically variable orifice assembly 110 is provided in the housing member 12. The orifice includes a frustoconical tapered opening 111 having a conical valve seat 112 at the end thereof communicating with the supply passage 71. Opening 111 communicates with both passage 99 and supply passages 70 and 71. Slidable within the opening 111 is a ball member 114. The ball member 114 is biased to a closed position by a spring 116 reacting against an adjustable spring seat 118 defined by a threaded plug 119 in housing 12.

It may be seen that the actual orifice defined by the orifice assembly 110 is the annular passage between the periphery of ball member 114 and the inside diameter of the opening 111. Since the opening 111 is tapered, the effective area of the orifice increases as the ball 114 moves away from seat 112. The degree of taper on the opening 111 is selected such that a predetermined pressure drop will be maintained against ball member 114, and consequently between passages 71 and 99, at flow rates above the predetermined startup value from pump 17.

That is, as the flow from the pump 17 exceeds some nominal rated capacity for the pump sufficient to produce a pressure drop across the orifice which will close the diaphragm valve 80, the ball 114 will move to the left increasing the biasing force of spring 116, increasing the effective area of the orifice and maintaining that pressure drop so that the pressure drop is not increased above that necessary to maintain the diaphragm valve 80 closed and in this manner the back pressure in passage 71 acting on the pump 17 is limited to a substantially predetermined value so as not to place an undue load on the pump 17 if it has a capacity above that nominally rated.

At the same time, the movement of the ball 114 in the opening 111 serves to minimize the possibility of clogging of the orifice defined by the ball and the opening.

The ball member 114 also serves as a valve when seated against seat 112 preventing the flow of fluid from the pump to the main valve chamber 60 at very low flow rates and also when purge or bleed valve 118a is open thereby preventing bleed fluid from entering the main regulating valve.

While the operation of the present device is believed obvious from the above description, it is believed desirable to briefly review the overall function of the present regulating valve. With the pump 17 at rest the ball valve 114 is seated against seat 112 and the diaphragm valve 80 is open under the influence of spring 102 so that the main regulating valve chamber 60 is vented. As the pump 17 begins rotation and its r.p.m. increases, there occurs a pressure rise in passage 71 with the consequent opening of ball valve 114. Because of the restricted passage provided by the ball valve 114 to the passage of fluid between passages 71 and 99, a pressure drop is produced therebetween applied to the opposite sides of diaphragm 88 through the ports 105 and 96, respectively. When the pump 17 reaches the predetermined start-up r.p.m., a sufficient pressure drop, e.g. 5 p.s.i., will result to cause ball valve 114 to close valve 100 against port 89 in opposition to the force of spring 102.

The venting of supply fluid through port 89 then immediately ceases and a rapid buildup of pressure in main regulating valve chamber 60 occurs, and the regulating valve member 44 opens and operates to maintain a substantially constant pressure in nozzle burner port 36.

When the pump 17 is shut off, at a predetermined high r.p.m. of the pump 17, the pressure drop across ball 114 will fall below the pressure drop necessary to maintain diaphragm 80 closed, and the latter will open rapidly venting the main regulating valve chamber 60 and permitting the valve member 44 to move rapidly to its closed position preventing smoking at the burner nozzle.

As explained above, at speeds of the pump 17 above that required to maintain the diaphragm valve 80 closed as shown in the drawing, ball valve 114 will move proportionately away from seat 112 increasing the area of the orifice around the ball to maintain a substantially constant pressure drop at above design pump capacities or speeds to limit the back pressure on the pump 17.

The Belleville spring 102 contributes to the fast response of the diaphragm valve 80 providing improved opening and cutoff of the main regulating valve 34. As seen in the drawings, the Belleville spring 102 has a conical portion 140 with inwardly projecting tapered fingers 141 bent at 142. The construction provides quick action characteristics of the spring 102 both on opening and cutoff of the diaphragm valve 80 preventing the secondary opening of the main regulating valve.

Viewing FIG. 4 wherein the hydraulic and spring reaction forces on the diaphragm 88 are shown with variations in discharge flow, it will be seen that spring 102 exerts a force on the diaphragm, represented b curve 145 that increases (proceeding from right to left on the curve) at discharge flows from the pump immediately below the flow (illustrated at 148) necessary to maintain the diaphragm valve closed. Curve 150 represents the net hydraulic force tending to close the diaphragm valve.

The instant the power is shut off to the motor driving the pump 17, the pump speed decreases as does the flow from the pump. The pressure drop over the valve member 114 decreases in proportion to this decrease in flow. When the net hydraulic force (illustrated by curve 150) acting on the diaphragm valve 88 becomes less than the opposing spring force (illustrated at curve 145), the diaphragm valve opens and discharge pressure is reduced to near 0 p.s.i.

At this instant the discharge flow is increased slightly as shown by curve 150 due to the higher volumetric efficiency of the pump at lower downstream pressures. This results in a higher pressure drop across the ball 114 which tends to slow the opening movement of the diaphragm valve 80 and may, in the absence of spring like that at 102, even momentarily close the diaphragm valve (sometimes referred to as secondary closing) permitting the system pressure to buildup sufficiently to cause main valve 34 to open (sometimes referred to as secondary opening) resulting in a poor cutoff.

The quick action characteristic of the Belleville spring 102 eliminates this problem by increasing the response of the diaphragm valve since the force of the spring increases as its compressed length increases as the valve opens as shown clearly in FIG. 4. On valve closure (proceeding left to right on the curve) there is a lessening of the spring force as the valve member 100 nears port 89 so that the hydraulic pressure differential quickly closes the valve.

I claim:

1. A regulating valve assembly for an oil burner, comprising: supply passage means, burner nozzle outlet passage means, a main regulating valve for controlling the flow of fluid in said outlet passage means, and valve means for controlling the flow of fluid to said main regulating valve to provide a rapid closure thereof when flow in said supply passage decreases below a predetermined value, means for controlling the valve means including an automatically variable size orifice in said supply passage means, and means responsive to the pressure at said orifice for controlling said valve means.

2. A regulating valve assembly as defined in claim 1, wherein said orifice includes a generally circular opening communicating with said supply passage means, and a spring-biased valve member in said opening.

3. A regulating valve assembly as defined in claim 2, wherein said opening has a valve seat for said valve member constructed to close said supply passage when the valve member is seated, one of said opening and valve member being tapered so that the area of the orifice increases as the valve member moves away from the seat in opposition to its biasing force.

4. A regulating valve assembly as defined in claim 3, wherein the taper is sufficient to maintain a predetermined pressure drop across said ball valve at flow rates above a predetermined value.

5. A regulating valve assembly as defined in claim 1, wherein said automatically variable size orifice is constructed to provide a variable flow area, at flow rates in said supply passage means above a predetermined value, to maintain a substantially constant pressure drop across said orifice.

6. A regulating valve assembly as defined in claim 1, wherein said valve means includes a diaphragm valve having a low pressure outlet port, a control port and an inlet port, means communicating the supply passage means upstream of said orifice to said control port in a direction tending to close said outlet port, said inlet port communicating with said main regulating valve means and said supply passage means downstream of said orifice, whereby the pressure drop across said orifice tends to close said valve means and at a predetermined decrease in flow in said supply passage means permits the diaphragm valve to open porting fluid from said regulating valve means to said outlet port thereby permitting rapid closure of said regulating valve.

7. A regulating valve assembly for a fuel oil burner, comprising: supply passage means for supplying fluid under pressure, a main regulating valve including a burner nozzle outlet port, a movable valve member, means biasing said valve member to a position closing said burner nozzle outlet port, said movable valve member defining a chamber when pressurized tending to open said movable valve member, said supply passage means communicating with said chamber to supply fluid thereto, valve means for venting said chamber upon a reduction in flow of fluid in said supply passage means to permit rapid closure of said movable valve member, and means for controlling said valve means including a variably sized orifice in said supply passage means, said orifice being responsive to flow rates in said supply passage means above a predetermined value for increasing the area thereof and maintaining a substantially constant pressure drop across said orifice, said valve means being responsive to the pressure drop across said orifice.

8. A regulating valve assembly for a fuel oil burner as defined in claim 7, wherein said orifice includes an opening communicating with said supply passage means, a valve member in said opening of smaller diameter than said opening so that the orifice is defined by the annular space between the valve member and the opening.

9. A regulating valve assembly, comprising: supply passage means for supplying fluid under pressure, a main regulating valve including a burner nozzle outlet port, a valve member biased to a position closing said burner nozzle outlet port and defining a valve chamber which when pressurized tends to open said valve member, said supply passage communicating with said chamber, valve means for controlling the fluid pressure in said chamber to permit the rapid closure of said valve member including a diaphragm operated valve, means responsive to fluid flow in said supply passage means for controlling said diaphragm operated valve.

10. A regulating valve assembly as defined in claim 9, wherein said diaphragm operated valve includes a valve chamber having a low pressure outlet port on one side thereof, a diaphragm in said chamber having a valve surface adapted to close said outlet port, an inlet port on the same side of the diaphragm as said outlet port, a control port on the opposite side of the diaphragm, an orifice in said supply passage means, first passage means communicating said supply passage means upstream of said orifice with said control port, second passage means communicating said supply passage means downstream of said orifice with said inlet port, and means biasing said diaphragm to an open position whereby upon flow in said supply passage means below a predetermined valve the biasing means will open said outlet port depressurizing the main valve chamber and upon flow in said supply passage means above a predetermined value the pressure drop across the orifice will cause closure of said diaphragm valve and the rapid buildup of pressure in said main valve chamber.

11. A regulating valve assembly, comprising: supply passage means for supplying fluid under pressure, a main regulating valve including a burner nozzle outlet port, a valve member biased to a position closing said burner nozzle outlet port and defining a valve chamber which when pressurized tends to open said valve member, said supply passage communicating with said chamber, valve means for controlling the fluid pressure in said chamber to permit the rapid closure of said valve member including a valve member for venting said chamber when in an open position, means responsive to fluid flow in said passage means for controlling said valve member, and spring means for urging said valve member away from a closed position toward its open position, said spring having a force to length characteristic such that it exerts a greater opening force on said valve member as the latter moves away from its closed position to assure rapid opening of said valve member.

12. A regulating valve assembly as defined in claim 11, wherein said spring means is a Belleville spring.

13. A regulating valve assembly as defined in claim 9, including spring means for urging said diaphragm valve away from a closed position toward an open position and having a force-to-length characteristic such that it exerts a greater opening force on the valve member as the latter moves away from its closed position to provide quick action opening.

14. A regulating valve assembly as defined in claim 13, wherein conversely said spring means has a force-to-length characteristic such that it exerts a lesser opening force on said valve member as the latter moves toward its closed position to provide quick-action closing.

15. A regulating valve assembly as defined in claim 7, including spring means urging said vent valve means away from a closed position toward an open position and having a force-to-length characteristic such that it exerts a greater opening force on the valve means as the latter moves toward open, and a lesser opening force as it moves toward closed.